W. B. LEWIS & J. R. MANSFIELD.
TRUCK.
APPLICATION FILED JULY 17, 1908.
922,005.
Patented May 18, 1909.
2 SHEETS—SHEET 1.
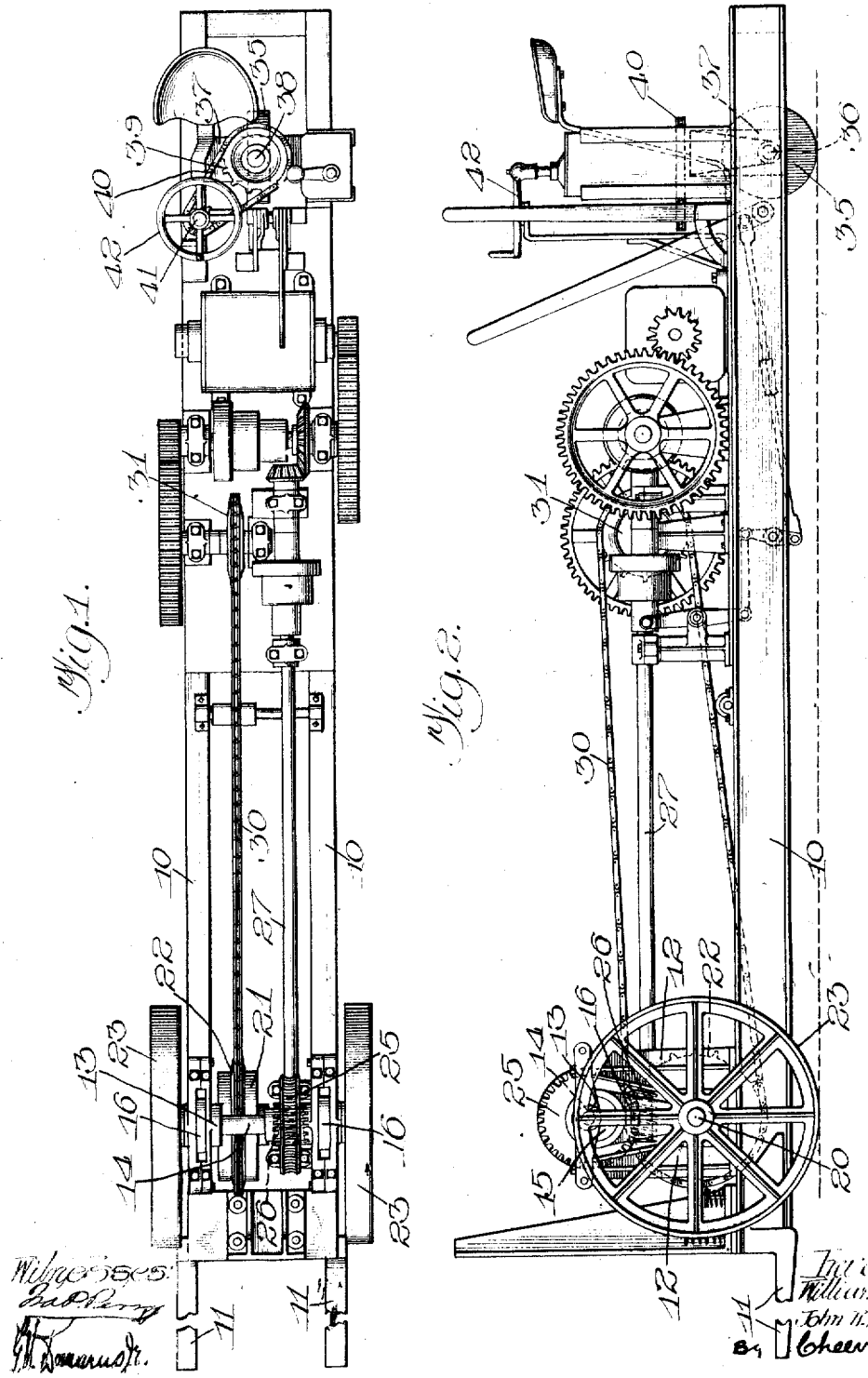

W. B. LEWIS & J. R. MANSFIELD.
TRUCK.
APPLICATION FILED JULY 17, 1908.
922,005.
Patented May 18, 1909.
2 SHEETS—SHEET 2.
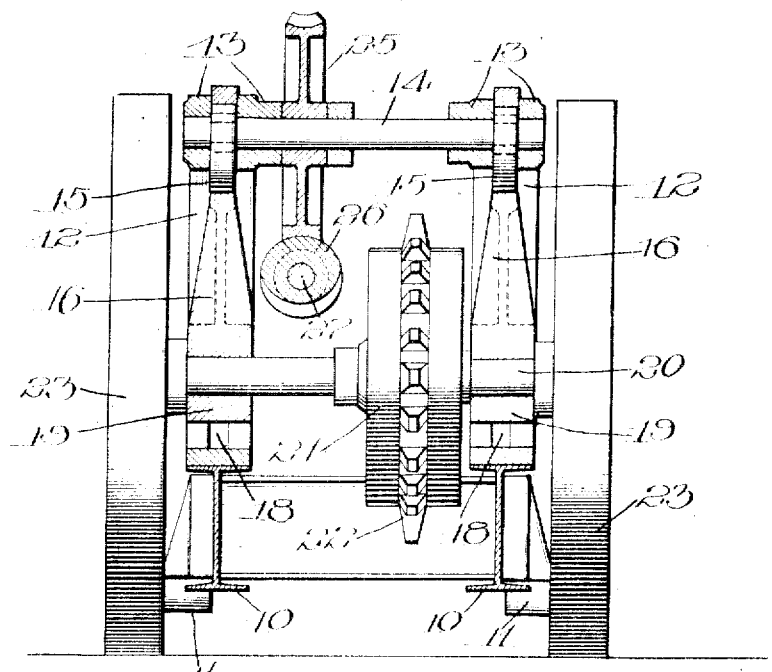
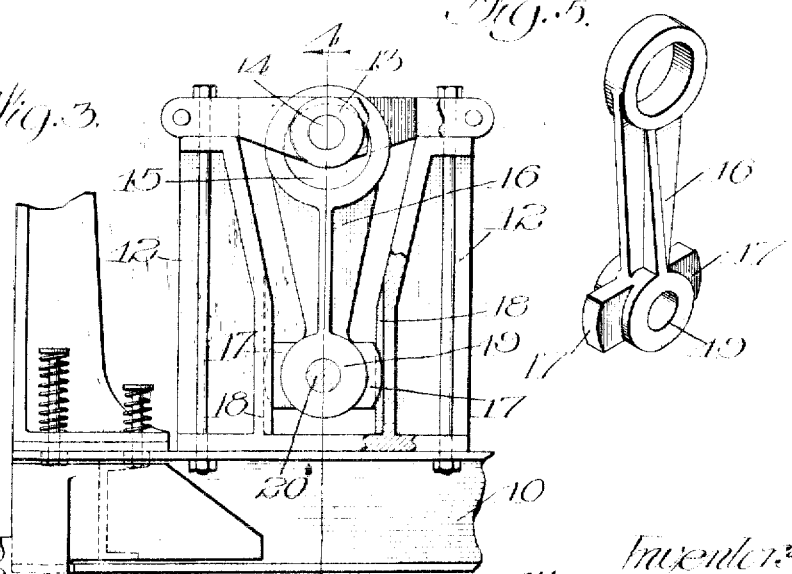
Witnesses
Inventors
William B. Lewis
John R. Mansfield
By Cheever & Cox

UNITED STATES PATENT OFFICE.

WILLIAM B. LEWIS AND JOHN R. MANSFIELD, OF HARVEY, ILLINOIS, ASSIGNORS TO WHITING FOUNDRY EQUIPMENT COMPANY, OF HARVEY, ILLINOIS, A CORPORATION OF ILLINOIS.

TRUCK.

No. 922,005.   Specification of Letters Patent.   Patented May 18, 1909.

Application filed July 17, 1908. Serial No. 444,078.

*To all whom it may concern:*

Be it known that we, WILLIAM B. LEWIS and JOHN R. MANSFIELD, citizens of the United States, residing at Harvey, Cook county, Illinois, have invented a new and useful Improvement in Trucks, of which the following is a specification.

Our invention relates in general to trucks for lifting objects from the ground and transporting them, and especially to charging machines for annealing ovens.

As a result of some of the special features of our invention the machine is particularly adapted to be power driven and to handle extra heavy weights at the will of a single operator.

The general object of the invention is to provide a truck of this character which shall be precise in its operation, adapted to operate under power with independent hoisting and motive apparatus, and able to turn upon a short radius without interfering with the hoisting apparatus.

An ancillary object of the invention is to provide means whereby the carrying end of the truck will move always straight up and down in a vertical direction instead of in an arc, also to provide a construction such that horizontal thrusts or forces due to shocks or jars, shall have no tendency to raise or lower the truck frame.

These objects are accomplished by the mechanism illustrated in the accompanying drawings, in which:

Figures 1 and 2 are plan and side views respectively of the truck embodying the invention. Fig. 3 is a side elevation of the parts associated with the raising and lowering mechanism. Fig. 4 is a sectional elevation taken on the line 4—4 Fig. 3, and Fig. 5 is a perspective view of the pitman whereby the carrying end of the truck is raised and lowered.

Similar numerals refer to similar parts throughout the several views.

In the preferred design shown in the drawings, the truck frame consists in the main of two parallel beams 10 rigidly secured together and provided at the forward end with a platform 11 on which an annealing pot or other weight may be carried. Near the forward end of the truck is fastened a frame 12 which is provided with bearings 13 wherein an eccentric shaft 14 is journaled. Rigidly secured upon shaft 14 are two eccentrics 15 which rotate within pitmen 16, one of these pitmen being shown in perspective in Fig. 5. Near the lower end these pitmen have a cross head consisting of wings 17 adapted to slide within the vertical grooves 18 in frame 12 as best shown in Fig. 3. The result is that when shaft 14 is rotated the cross head on the pitmen will be guided in a vertical direction in the framework of the truck. A journal bearing 19 is formed at the lower end of each pitman for the axle 20. In this preferred design the machine is power driven and the axle 20 is formed in two parts connected by a differential gear 21 provided with sprocket teeth 22. Each part of the axle has a truck wheel rigidly secured to it so that when the sprocket 22 is rotated the truck will move forward or backward as the case may be.

It is evident that when shaft 14 is rotated in its bearings 13 it will cause a raising and lowering of the forward end of the truck relatively to the axles 20 which are at a fixed height from the floor. Shaft 14 might of course be rotated by hand and might be moved by the physical exertion of one or more operators, but some of the features of construction of the machine are especially advantageous in a power driven and power controlled apparatus and it is for this reason that we have shown a type of machine which is power driven. The driving mechanism will now be briefly described.

Rigidly secured to shaft 14 is a gear 25 which is engaged by a worm 26 rigidly secured to a shaft 27 running to the back of the machine. Shaft 27 is controlled and operated by suitable driving mechanism, the construction of which is immaterial as far as the present invention is concerned. Sprocket 22 which operates the differential gear 21 is driven by means of a chain 30 which leads from a driving sprocket and is operated by power mechanism, the construction of which has no special bearing upon the invention as herein claimed.

In the form of machine here shown the rear end of the framework is supported by a single steering wheel or roller 35 having an axle 36 mounted in a frame 37 which is rotatable about a vertical shaft 38. Said shaft is controlled by a sprocket 39 operated by a chain 40 leading from a sprocket 41 controlled by the controlling wheel 42 as best shown in Fig. 1.

In operation when the shaft 27 is rotated the eccentric shaft 14 will be rotated and will cause the frame of the truck to be raised or lowered. The axle 20 of course remains at a constant height from the floor and as the frame moves up and down, the guiding action of the cross head wings 17 in the slots 18 will cause the forward end of the frame to move practically straight up and down; moreover lateral movement of the truck frame relatively to the pitman will be prevented. This produces a rigid machine which works freely and at the same time avoids any tendency for horizontal thrusts or forces to influence the eccentric or tend to cause a raising or lowering of the machine. For example, if the truck wheels should strike an obstruction on the floor, the momentum, acting horizontally forward would be absorbed by the crosshead guides and would not affect the raising and lowering mechanism.

As the axle is formed in two parts joined through a differential gear the motive power can be applied continuously whether the machine is moving straight ahead or turning upon a long or short radius.

Having thus described the invention, what we claim as new and desire to secure by Letters Patent, is:

1. In a truck, the combination of a truck frame, truck wheels, an axle for said wheels, a pitman journaled on said axle and eccentric connections between said pitman and said truck frame whereby the frame may be raised and lowered.

2. In combination, a truck frame and axle, one of which is movable relatively to the other, guiding means for constraining one of said movable parts to move in a substantially straight line with reference to the other, wheels for supporting said axle, an eccentric for causing relative movement of said truck frame and axle, and a worm and gear for operating said eccentric.

3. In combination, a truck frame, truck wheels, an axle for said truck wheels, an eccentric rotatably mounted in said truck frame and a pitman supported upon said axle and adapted to coöperate with said eccentric to raise and lower the truck frame, said pitman working in guides which are arranged substantially vertically in said frame.

4. In a truck, a truck frame, truck wheels, an axle for said truck wheels, a pitman supported at one end at a fixed elevation with reference to said truck wheels, a substantially straight vertical guide in said frame for guiding the lower end of said pitman, and an eccentric rotatably mounted in said frame for operating said pitman.

5. In a truck, a truck frame, truck wheels, an axle for said truck wheels, a pitman supported at its lower end upon said axle, a guide in said frame for guiding the lower end of said pitman and means at the upper end of said pitman for raising and lowering the frame relatively thereto.

6. In a charging truck for annealing ovens, the combination of a truck frame, truck wheels, an axle for said wheels, a pitman wherein said axle is journaled, guides in said frame operative upon said pitman near the portion thereof where said axle is journaled whereby the frame is vertically movable with reference to the guided portion of said pitman and to said axle and at the same time prevents forward or backward play of the axle without producing any tendency to move the pitman up or down, and an eccentric supported in said pitman and supporting said frame.

7. In a charging truck for annealing ovens, the combination of a truck frame, truck wheels, an axle for said wheels, a pitman wherein said axle is journaled, guides in said frame operative upon said pitman near the portion thereof where said axle is journaled whereby the frame is vertically movable with reference to the guided portion of said pitman and to said axle and at the same time prevents forward or backward play of the axle relatively to the frame, an eccentric supported in said pitman and adapted to support said frame, and means on said frame for rotating said eccentric.

8. In a truck, the combination of a truck frame, truck wheels, an axle for said wheels, a pitman supported upon said axle, an eccentric supported in said pitman and adapted to support said frame, means in said frame for vertically guiding said pitman at the point where it is supported upon said axle, said axle being formed in two parts each rigidly secured to one of said truck wheels, a differential driving gear connecting the parts of said axle, and driving means on said frame connected to said differential gear for driving the latter.

9. In a truck, the combination of a truck frame, truck wheels, an axle for said wheels, a pitman supported upon said axle, an eccentric supported in said pitman and adapted to support said frame, means in said frame for vertically guiding said pitman at the point where it is supported upon said axle, said axle being formed in two parts each rigidly secured to one of said truck wheels, a steering wheel for steering the truck, a differential gear connecting the parts of said axle whereby the truck may be driven straight ahead or in curves and a power device on said truck frame connected to said differential gear for driving it.

10. In a charging truck for annealing ovens, a truck frame having a carrying platform rigid therewith, truck wheels, an axle for said wheels, two pitmen journaled at one end on said axle, an eccentric shaft journaled in the other end of said pitmen and also eccentrically journaled in said frame, and a worm and gear mounted upon said frame for rotating said shaft to thereby raise and lower the frame and carrying platform.

WILLIAM B. LEWIS.
JOHN R. MANSFIELD.

Witnesses:
JNO. T. KRIEGER,
J. A. FARRIS.